United States Patent [19]

Dickmeyer

[11] Patent Number: 5,507,089
[45] Date of Patent: Apr. 16, 1996

[54] METHOD OF ASSEMBLY OF A VARIABLE RELUCTANCE SENSOR

[75] Inventor: David A. Dickmeyer, Fort Wayne, Ind.

[73] Assignee: Component Sales & Consultants, Inc., Fort Wayne, Ind.

[21] Appl. No.: 396,865

[22] Filed: Mar. 1, 1995

Related U.S. Application Data

[63] Continuation of Ser. No. 178,113, Jan. 6, 1994, abandoned, which is a continuation-in-part of Ser. No. 888,334, May 22, 1992, Pat. No. 5,278,496.

[51] Int. Cl.$^6$ ............................................. H01F 41/06
[52] U.S. Cl. .................. 29/605; 156/73.1; 324/207.15; 336/96; 336/98
[58] Field of Search ...................... 29/602.1, 605; 324/207.15, 207.16, 174; 336/96, 98; 156/13.1

[56] References Cited

U.S. PATENT DOCUMENTS

| | | | |
|---|---|---|---|
| 3,614,615 | 10/1971 | Cass | 324/161 |
| 3,793,545 | 2/1974 | Leiber et al. | 310/168 |
| 4,024,484 | 5/1977 | Tomczak et al. | 336/30 |
| 4,045,738 | 8/1977 | Buzzell | 324/174 |
| 4,166,977 | 9/1979 | Glauert et al. | 324/173 |
| 4,268,771 | 5/1981 | Lace | 310/155 |
| 4,419,646 | 12/1983 | Hermle | 336/90 |
| 4,529,933 | 7/1985 | Bleeke | 324/173 |
| 4,596,973 | 6/1986 | Form et al. | 336/96 |
| 4,626,781 | 12/1986 | Forkel | 324/174 |
| 4,647,892 | 3/1987 | Hewitt | 36/83 |
| 4,652,818 | 3/1987 | Buchschmid | 324/174 |
| 4,680,543 | 7/1987 | Kohen | 324/208 |
| 4,683,402 | 7/1987 | Aubrey | 315/56 |
| 4,700,133 | 10/1987 | Day | 324/208 |
| 4,804,911 | 2/1989 | Saito et al. | 324/167 |
| 4,829,245 | 5/1989 | Echasseriau | 324/174 |
| 4,847,557 | 7/1989 | Saito et al. | 324/208 |
| 4,849,728 | 7/1989 | Goll et al. | 336/92 |
| 4,922,197 | 5/1990 | Juds et al. | 324/207.21 |
| 4,922,757 | 5/1990 | Rozelle et al. | 73/660 |
| 4,937,522 | 6/1990 | Gee | 324/174 |
| 5,016,343 | 5/1991 | Schutts | 29/605 |
| 5,021,737 | 6/1991 | Schutts | 324/207.11 |
| 5,032,790 | 7/1991 | Johnson | 324/174 |
| 5,039,942 | 8/1991 | Buchschmid et al. | 324/174 |
| 5,121,056 | 7/1992 | Onishi et al. | 324/207.15 |

*Primary Examiner*—Carl E. Hall
*Attorney, Agent, or Firm*—Baker & Daniels

[57] ABSTRACT

A method of securing the bobbin assembly of a variable reluctance sensor within a hollow sensor shell having an opening in the front wall thereof to permit the magnet of the bobbin assembly to be exposed therethrough. A welding apparatus is provided for automatically ultrasonically welding the rear portion of the bobbin assembly to the open rear end portion of the shell, thereby preventing fluid flow through the rear end of the shell. The welding process forces the bobbin assembly into the sensor shell sufficiently to compress the front elastomeric seal between the front flange of the bobbin assembly and the inner surface of the front wall of the shell.

19 Claims, 8 Drawing Sheets

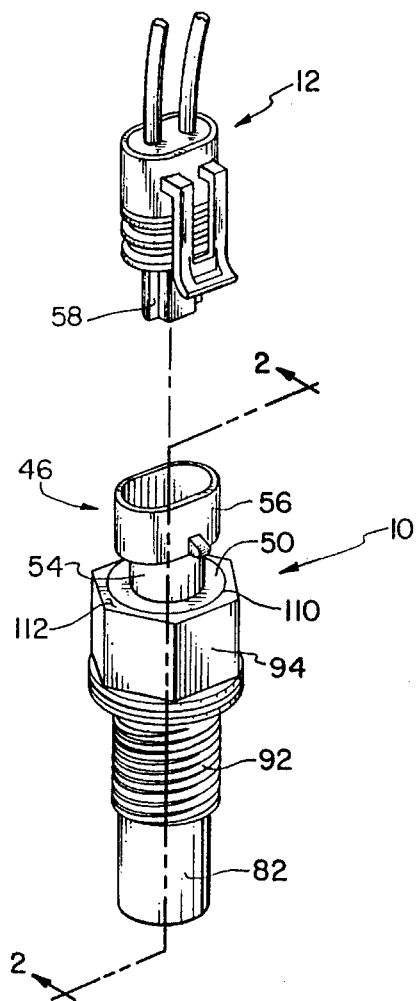
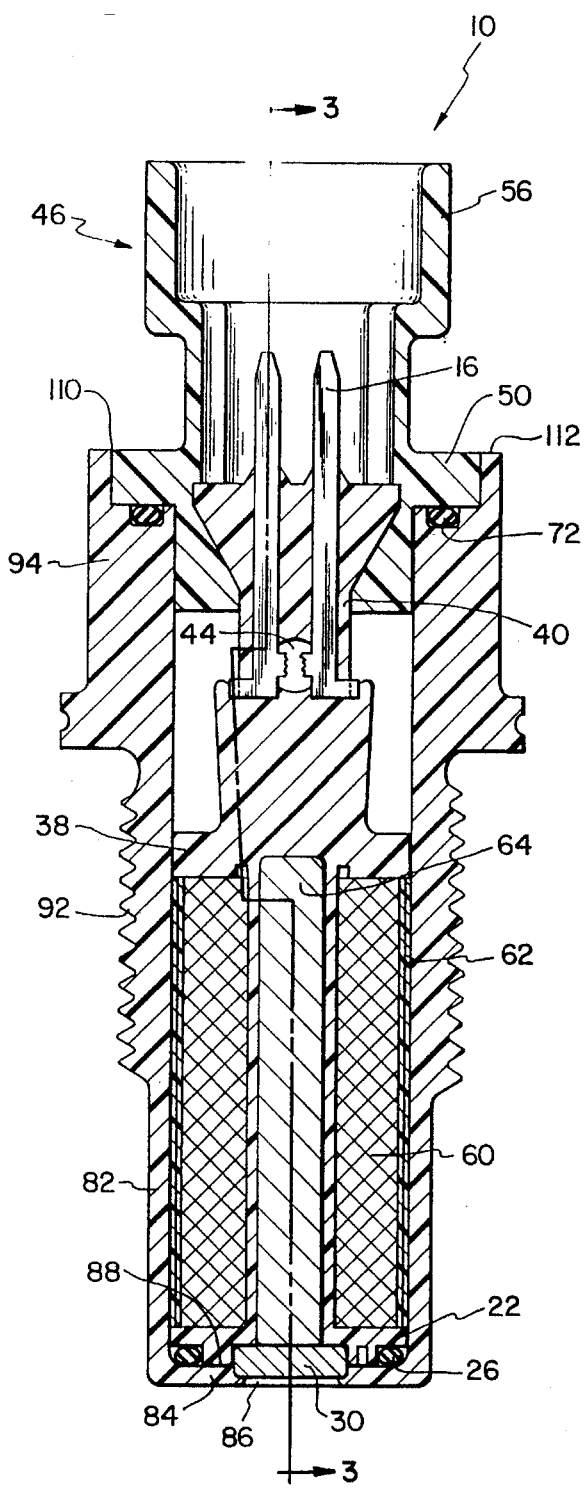
FIG. 1
FIG. 1A
FIG. 2

METHOD OF ASSEMBLY OF A VARIABLE RELUCTANCE SENSOR

CROSS REFERENCE TO RELATED APPLICATION

This is a continuation of application Ser. No. 08/178,113, filed Jan. 6, 1994, now abandoned, which is a continuation-in-part of application Ser. No. 07/888,334, filed May 22, 1992 and issued as U.S. Pat. No. 5,278,496 on Jan. 11, 1994.

BACKGROUND OF THE INVENTION

The present invention relates generally to packaged electronic sensors, and more particularly to packaged electromagnetic type pickups, also known as magnetic pickups, magnetic sensors, speed sensors, or more accurately variable reluctance sensors. Such sensors are used to measure the rotational speed or the position with respect to a fixed reference of a ferrous exciter rotor or reluctor wheel.

Variable reluctance speed and position sensors are well-known and widely used in automotive applications. A general theory of variable reluctance sensor operation is explained in, for example, U.S. Pat. No. 3,614,615, issued to Cass, and U.S. Pat. No. 4,045,738, issued to Buzzell.

The early automotive applications of variable reluctance sensors were for inputting of speed information for electronic speedometers and tachometers on heavy and medium duty trucks and off-road equipment (agricultural, construction, and recreational). The speed sensors were also used to supply wheel speed information for antiskid braking systems for heavy trucks. In general the sensors comprised a plastic bobbin which housed the magnetic elements (pole piece and magnet) and magnet wire. The bobbin assembly was encapsulated into a metal or plastic housing via injection molding of thermoplastic resins or via transfer molding of thermosetting resins, or the encapsulating material itself served to house the bobbin assembly. The encapsulating process frequently caused damage to the magnet wire which resulted in an "open circuit" failure condition early in field service as temperature cycling caused the damaged magnet wire to break (open circuit).

More recently, applications for variable reluctance sensors have increased. With the advent of more aerodynamic vehicles and the use of four and six cylinder engines at higher rpm's to attain power levels of eight cylinder engines as well as to achieve improved fuel economy, the under hood temperatures are higher. The mounting locations for these sensors in the new applications place them in transmission fluid, engine oil, hydraulic fluid, and salt water which are corrosive materials or carriers of corrosive agents used in the manufacture (machining) of metal parts. Together with longer warranty objectives, these harsher environmental conditions have required more difficult and more accelerated life testing for sensor design validation.

As automotive O.E.M.'s continue to look for ways to meet government mandates for emission levels and fuel consumption and to provide improved vehicle performance and safety to consumers, usage of variable reluctance sensors is mushrooming. Some applications include but are not limited to: direct sensing crankshaft position for spark timing in distributorless ignition systems; direct sensing camshaft position for timing of sequential fuel injection systems; speed input of information for antilock braking systems, electronically controlled transmissions, automatic all wheel drive systems, traction control, as well as the previously mentioned input speed information for instrumentation (vehicle speed and engine speed); and direct sensing of camshaft position for variable camshaft timing systems designed to improve engine horsepower while simultaneously reducing emissions and fuel consumption.

A need for improved sensor reliability and design life is necessitated by the ever increasing warranty periods with targets for warranties out to 100,000 to 200,000 miles as well as by the critical nature of functions performed on vehicles by the sensors as described above. Failure of the variable reluctance sensor will result in vehicle non-operation, safety risk, or poor engine performance in emission control or fuel consumption.

As the warranty periods and use of variable reluctance sensors for critical functions increase, the latent failure modes as well as early failure modes of variable reluctance sensors must be addressed. All the while, the environmental conditions imposed upon these sensors are becoming more demanding.

Further, the output (threshold voltages) requirements are increasingly more difficult to meet because the package size available for the sensors is shrinking with smaller and lighter vehicles. Also, with emission requirements becoming tighter and even required during engine start-up, ignition timing must be achieved during engine start-up which means the same sensor output must be attained at lower exciter gear speeds. This translates to less propensity to induce voltage since the lower the speed of the exciter gear the less the propensity of a given system to induce voltage in a given sensor.

Together with the more critical nature of the applications and the harsher environments, much work has been done to reduce the encapsulation damage to the magnet wire, such as lower molding pressures and/or a provision of protective layering or shielding between the coil and encapsulant. Progress has been made in reducing failure rates; however, the open circuit condition still exists as a result of differing thermal expansion rates of the encapsulant and magnet wire or as a result of the transmission of encapsulant pressure damage through or around the protective layer.

Sealing from liquid intrusion must be provided at all points or surfaces on a variable reluctance sensor including the back and rear end (cable or connector end) of a sensor in applications where complete submersion is possible or where corrosive liquid splash or spill is possible. Many approaches have been taken to seal off the intrusion of corrosive liquids into the sensor. None have been successful in solving the open circuit condition resulting from encapsulation/thermal cycling damage and the sealing off of corrosive liquid intrusion, without sacrificing the output capability of the sensor.

In U.S. Pat. No. 4,680,543, issued to Kohen, a sleeve-like molded plastic cover surrounds the spool (coil), and the magnetic element abuts the inner surface of the cover wall. Further, an encapsulation occupies the spaces within the cover. The thickness of the cover wall increases the working air gap between the exciter rotor and the sensor magnetic element thereby reducing output capability. Also, the sensor coil is still subject to encapsulation/thermal cycle damage to the magnet wire coil. Lastly, although the cover seals off liquid intrusion at the sensing side of the sensor, the design does not provide for an adequate seal from liquid intrusion via the cable.

In U.S. Pat. No. 4,847,557, issued to Saito, et al., the sensor element is covered by a first thermosetting resin inside a case, wherein a second thermoplastic resin hermetically seals the opening in the case. One of the problems with this design is that it does not enable the use of a high coercive force rare earth magnet and thereby does not maximize the output capacity of the sensor. Further, encapsulants are utilized to form seals. In addition to causing magnet wire damage (sensor failure) during thermal cycling, encapsulants have proven to be an ineffective sealing medium during thermal shock or thermal cycles/submersion testing. In other words, this sealing approach has not been sufficient to eliminate intrusion of corrosive liquid into the sensor because the differing thermal expansion rates of the different materials cause any encapsulated material adhesion (sealing) to separate during thermal cycling, thereby creating a leak path.

Although Saito, et al. attempts to employ a seal ring between the bracket and the housing to overcome the separation phenomenon described above, the seal ring only provides a seal for one of three leak paths. The remaining two leak paths are still subject to the separation problem in thermal cycling: 1) between the output wire protective member and the second resin member, and 2) between the magnetic pole and the case, further between the bobbin and the case, and further between the bobbin and first resin member. Penetration of corrosive liquids via the leak paths will result in a shorted coil, resulting in sensor failure.

Consequently, a need exists for a variable reluctance sensor capable of high reliability, not subject to encapsulation damage and impervious to liquid intrusion while maximizing output capability per sensor package volume.

SUMMARY OF THE INVENTION

The present invention overcomes the problems of the above-described prior art sensor designs by providing a packaged electronic sensor housing that sealingly encases the output device of the sensor, yet also exposes the actual sensing component to the physical stimulus being sensed, thereby increasing the sensitivity capabilities of the sensor while protecting the delicate output device from damage caused by both thermal cycling and liquid intrusion.

In general, the invention provides a packaged sensor assembly including a sensing component for sensing a physical stimulus and generating a signal indicative thereof. An output device is connected to the sensing component for transmitting the signal to an external circuit. A housing encases both the sensing component and the output device. The housing includes a front end portion having a front wall with an opening therein to permit the sensing component to be exposed therethrough. The housing is sealed at both the front and rear in such a manner that fluid is prevented from reaching the output device in the interior of the housing.

More specifically, the invention provides, in one form thereof, a variable reluctance sensor having a bobbin including a closed-ended or blind cavity within the barrel portion of the bobbin. A pole piece is press fit into the cavity, and a permanent magnet is attached to a recess at an end of the bobbin adjacent the pole piece. Magnet wire is coiled about the barrel portion, and the start and end wires of the coil are soldered to the ends of terminals that are molded into the bobbin. A terminal connector is molded onto the bobbin and is designed to receive a separate submersible connector. The terminal connector includes a flanged portion. A front sealing O-ring is secured within a recess at the front of the bobbin. A rear sealing O-ring is provided in a groove in an inner flanged portion of a hollow outer shell. The shell is disposed over the bobbin such that the front and rear sealing rings are compressed to prevent the flow of fluid into the sensor interior. The flanged portion of the terminal connector is simultaneously ultrasonically welded with the rear portion of the outer shell to further seal the rear of the sensor. The magnetic element is exposed through an opening in the front wall of the outer shell; however, the flow of fluid through the front of the sensor housing is prevented by the front ring seal and the closed bobbin barrel.

An advantage of the variable reluctance sensor of the present invention is that the front seal ring and closed bobbin barrel enables the magnetic element to be exposed thereby not increasing the working air gap as is sacrificed with closed-ended housing designs.

Another advantage of the variable reluctance sensor of the present invention is that a relatively thin bobbin barrel is provided which reduces the internal magnetic air gap thereby increasing output capability and, in addition, enables small sensor package size as well as more space for the magnet wire coil, which further increases output capability.

A further advantage of the variable reluctance sensor of the present invention is that the magnet pocket in the housing and bobbin enables ease of assembly and assures centering of the magnet which is important for position sensing applications, as well as increases the output capability by reducing the internal magnetic air gap and external working air gap.

Yet another advantage of the variable reluctance sensor of the present invention is the vibrational or mechanical shock capability of the sensor is maintained as compared to conventional encapsulated sensors.

Yet another advantage of the variable reluctance sensor of the present invention is that the bobbin includes wire slots into which the start and finish wires of the magnetic coil fit, thereby protecting the magnet wire against damage in subsequent processing and further providing waste savings and elimination of latent failure mode.

Still another advantage of the variable reluctance sensor of the present invention is that the design requires few and common parts and lends itself to automated process in manufacturing.

Other advantages of the present invention will become apparent as the description proceeds.

The present invention, in one form thereof, provides a sealed sensor assembly including Sensing means for sensing a physical stimulus and for generating a signal indicative thereof. An output means is connected to the sensing means for transmitting the signal from the sensing means. A housing contains the sensing means and the output means and includes a rear end portion and a front end portion having a front wall with an opening therein to permit the sensing means to be exposed therethrough. A front sealing means is provided for sealing the output means from fluid flow through the opening. A rear sealing means is provided for sealing the output means from fluid flow through the rear end portion of the shell.

The present invention, in one form thereof, provides a sealed variable reluctance magnetic sensor comprising a bobbin including a barrel portion having a cavity therein. A pole piece is provided in the cavity, and a magnetic element is secured to the bobbin adjacent the pole piece. An electric coil is wound around the barrel. An outer hollow shell surrounds the coil and includes an open rear end portion and a front end portion having a front wall with an opening therein to permit the magnetic element to be exposed therethrough. A front seal is provided for sealing the electric coil from fluid flow through the opening, and a rear seal is provided for sealing the electric coil from the fluid flow through said rear end portion.

The present invention further provides, in one form thereof, a method of assembly of a sealed variable reluctance magnetic sensor. A bobbin is provided including a barrel portion having a cavity therein. The cavity is accessible from one end of the bobbin. A magnet wire is wound into a coil about said barrel portion. A start wire and a finish wire of the wire coil are attached to respective electrically conductive terminals for electrical output from the coil to an external circuit. A pole piece is inserted into the cavity, and a magnet is placed on the bobbin adjacent the pole piece. A front elastomeric seal is attached to a front edge of the bobbin to form a bobbin assembly. The bobbin assembly is then inserted into an outer hollow shell having an open rear end portion and a front end portion having a front wall with an opening therein. Thus, the magnet is exposed through the opening. In addition, the front seal is compressed between the front wall of the shell and the front edge of the bobbin to form a fluid tight seal therebetween upon inserting the bobbin assembly into the outer hollow shell. A rear seal is provided to seal the rear end of the housing.

In yet another embodiment, the invention comprises a method of encasing the bobbin assembly within the outer hollow shell in a manner that ensures that the front elastomeric seal is sufficiently compressed between the front bobbin flange and the front wall of the sensor shell to prevent to flow of fluid around the front seal. A multistation welding apparatus is provided for automatically compressing the front seal and simultaneously ultrasonically welding the bobbin assembly to the open rear end portion of the outer hollow shell, thereby forming a fluid impervious seal therebetween. At the first station, a measuring device in the form of a simulated weld horn is moved from an initial position to a final position in which the horn engages either the bobbin assembly or a simulated outer hollow shell to force the front flange of the bobbin assembly against a surface representing the inner surface of the front wall of the hollow shell. Once engaged, the final position of the measuring device is stored in a memory. The bobbin assembly is then moved to a second station in which the actual hollow shell is applied to the bobbin assembly. A weld horn is then lowered to the measured final position wherein the forward surface of the bobbin assembly engages the inner front wall surface of the sensor shell, which ensures that the elastomeric front seal is adequately compressed. The rear end portion of the shell is simultaneously ultrasonically welded to the rear portion of the bobbin assembly.

BRIEF DESCRIPTION OF THE DRAWINGS

FIG. 1 is a perspective view of a variable reluctance sensor in accordance with the principles of the present invention and further showing a submersible connector for attachment to the variable reluctance sensor;

FIG. 1A is an enlarged end view of the sensor of FIG. 1;

FIG. 2 is an enlarged vertical sectional view of the sensor of FIG. 1, taken along line 2—2 in FIG. 1;

DESCRIPTION OF THE PREFERRED EMBODIMENTS

Figure 3:
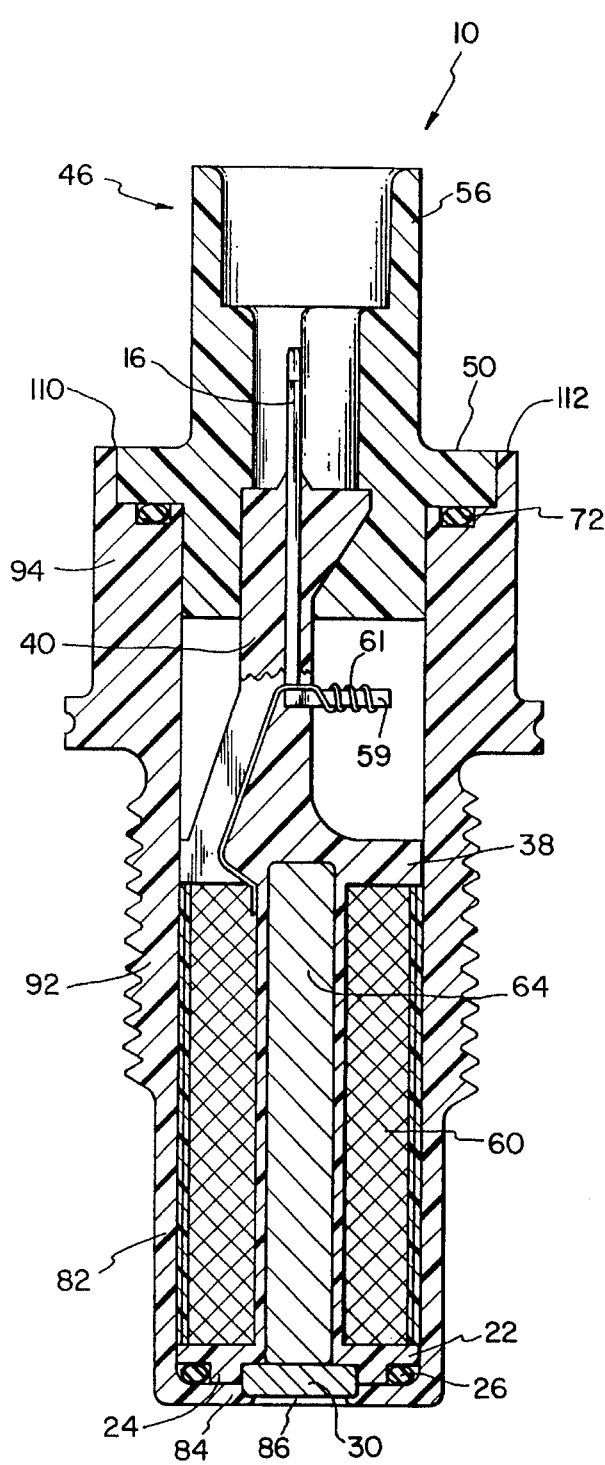
FIG. 3 is a sectional view of the sensor of FIG. 2, taken along line 3—3 in FIG. 2.

Referring now to the drawings, and in particular to FIG. 1, there is shown a variable reluctance sensor device 10 in accordance with principles of the present invention, and a conventional submersible connector 12 that is attached to sensor device 10. For purposes of the description of the components comprising sensor device 10, the following description will proceed in the order in which sensor device 10 is assembled.

Figure 4:
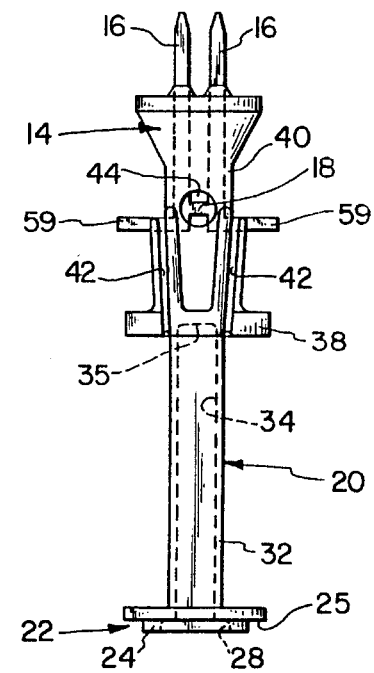
FIG. 4 is an enlarged elevational view of the bobbin assembly of the sensor of FIG. 1 with the terminal insert molded therein.

Referring now to FIG. 4, there is shown a stamping 14 which forms terminals 16 of sensor device 10. Preferably, the stamping is made of CA260 half hard brass which is then tin plated. The plating includes a copper flash to prevent nickel migration out of the brass. Stamping 14 is then mat tin plated 300 to 400 micro inches thick on the tin plate. Stamping 14 further includes a web portion 18 which is provided for ease of loading terminals 16 into the bobbin assembly which will be discussed hereinafter.

Figure 5:
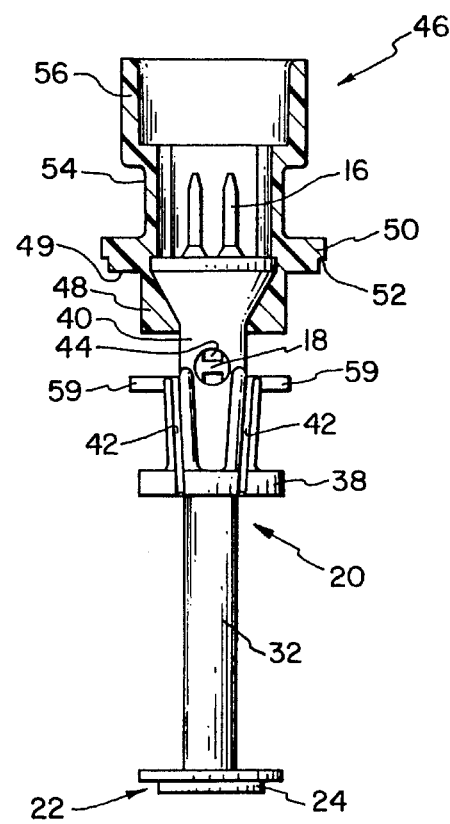
FIG. 5 is view of the bobbin assembly of FIG. 4, particularly showing a sectional view of the customer connector that is molded over the terminal end of the bobbin assembly.
Figure 7:
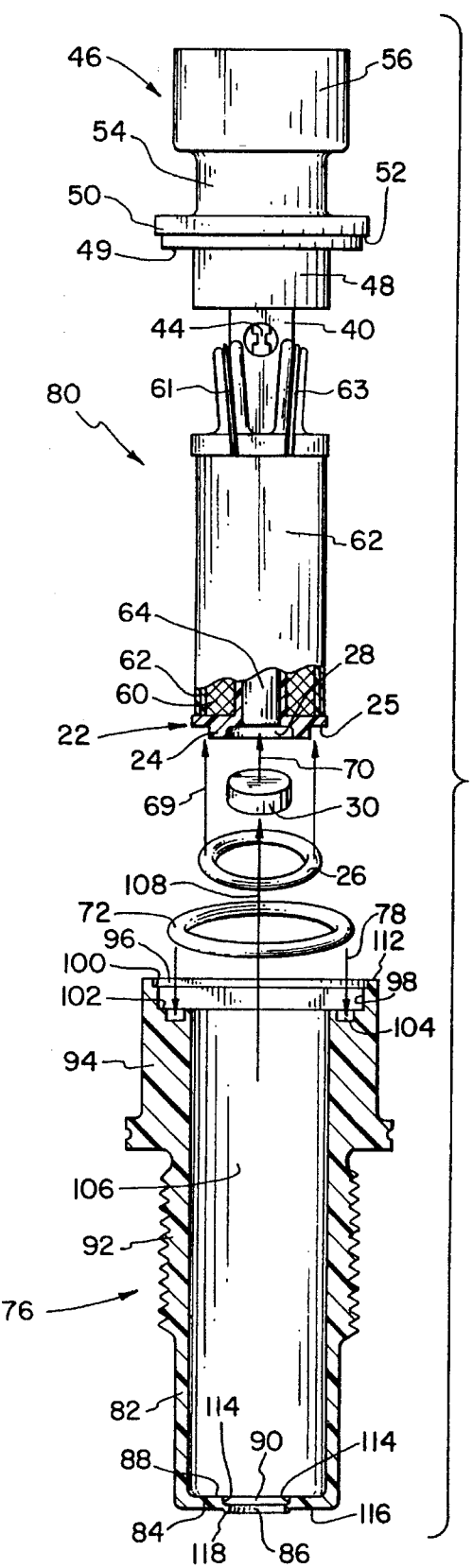
FIG. 7 is a view of FIG. 6, particularly showing the bobbin assembly being inserted into the sensor shell.

Referring now to FIGS. 4, 5, and 7, a bobbin 20 is provided and is preferably molded out of a polyether-imide such as Ultem (tm), commercially available from General Electric. Ultem is known to be a non-hygroscopic material. However, bobbin 20 may be made of other thermoplastic materials. Bobbin 20 includes a front flange 22 having a reduced diameter portion 24 to define a front groove surface 25 upon which a front seal ring 26 rests. The ID of reduced diameter portion 24 defines a pocket 28 for reception of a magnet 30. Bobbin 20 further includes a bobbin barrel portion 32 having a generally cylindrical opening or cavity 34 therein. The back end 35 of cavity 34 is closed-ended to eliminate a possible fluid flow path therethrough. Barrel 32 preferably has a wall thickness ranging from about 0.015 to about 0.025 inch, which is about 0.005–0.010 inch thinner than conventional bobbin barrel thickness. An advantage of this reduced wall thickness is to reduce the internal magnetic air gap in the sensor. Bobbin 20 further includes a rear flange 38 and a shank portion 40 having wire slots 42 integrally molded therein. Shank portion 40 further includes an opening 44 which exposes web portion 18 of stamping assembly 14.

Stamping assembly 14 is preferably insert molded into bobbin 20 to secure terminals 16 in place. In particular, the bobbin mold includes an opening in which stamping assembly 14 rests. The mold is then closed over the stamping, and the plastic is shot into the mold to form the desired bobbin configuration. Web 18 permits assembly 14 to be loaded into a mold in one single piece and thereby eliminates the necessity to align two separate terminals into the mold, thus resulting in more efficient and convenient loading of terminals 16 during molding of the bobbin as well as a reduction of manufacturing costs. Since the insert molded terminals are rigidly captured within bobbin 20, a strain relief for the sensing and output means is built into the sensor assembly.

Figure 10:
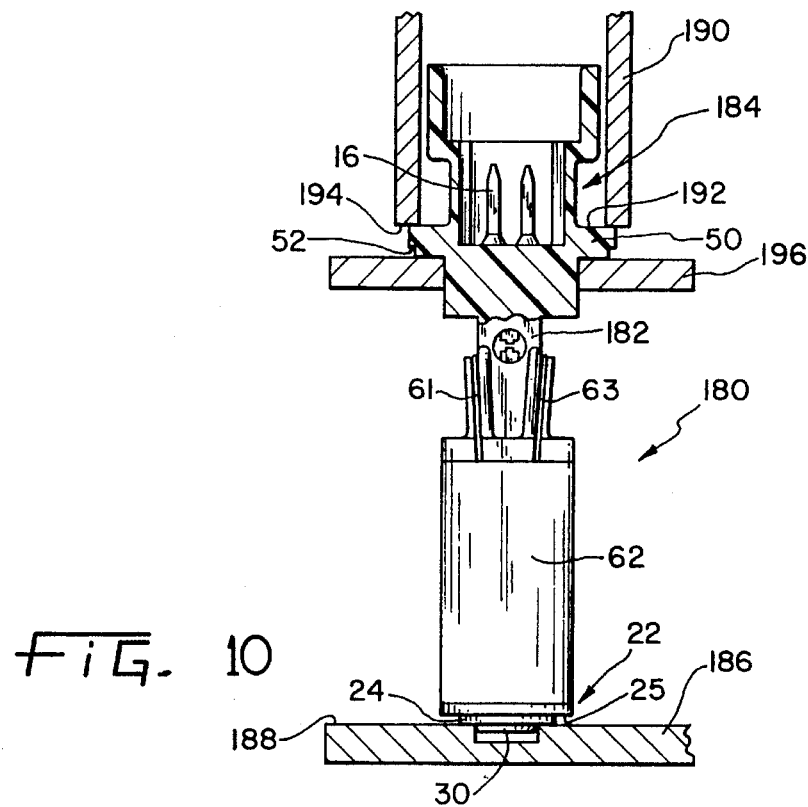
FIG. 10 is an elevational view of an alternative embodiment of the bobbin assembly of FIG. 1, with the integral connector shown in section, wherein the bobbin assembly is retained within a weld fixture at a first station of a welding apparatus.
Figure 11:
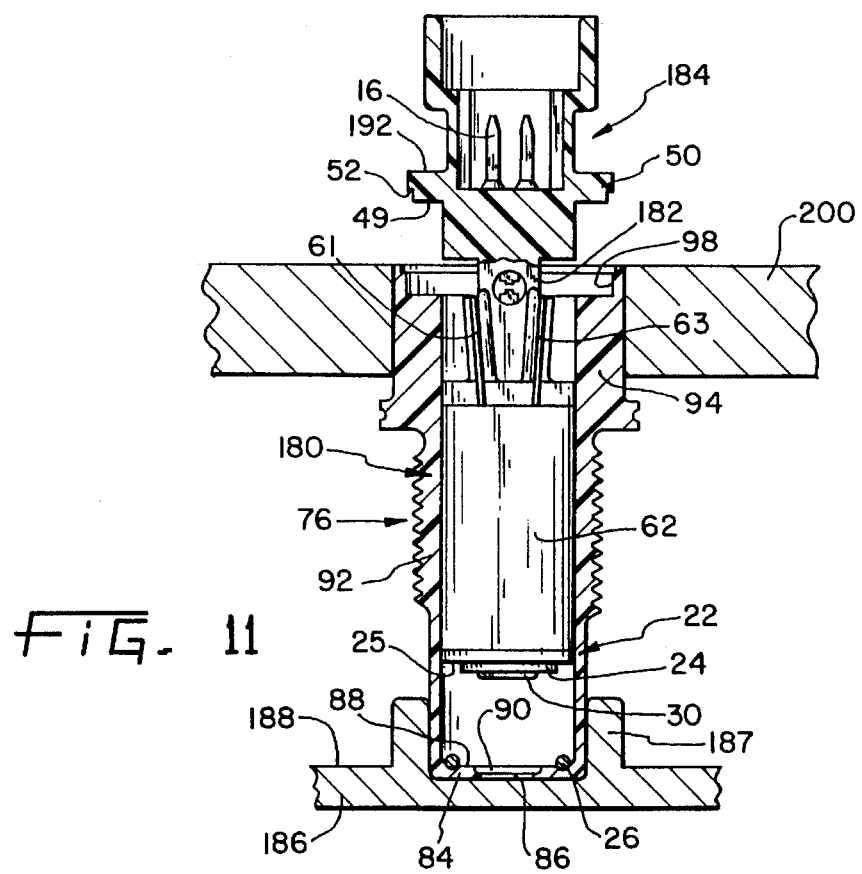
FIG. 11 is a view of the bobbin assembly of FIG. 10, particularly showing the bobbin assembly being inserted into a hollow sensor shell at a second station of the welding apparatus.
Figure 12:
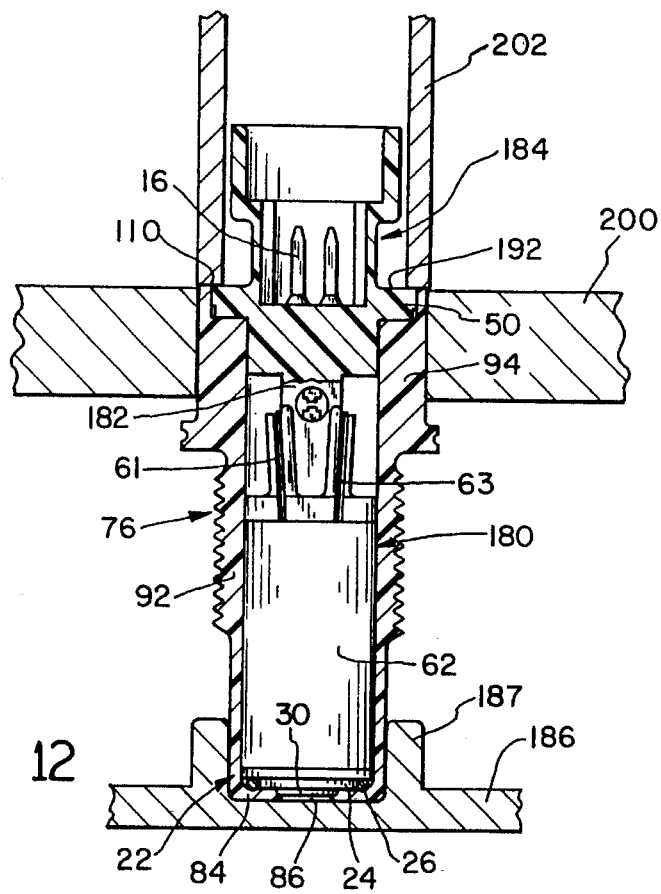
FIG. 12 is a view of the bobbin assembly of FIGS. 10 and 11, particularly showing the weld horn positioned to weld the hollow sensor shell to the bobbin assembly at the second station.

After assembly 14 is insert molded into bobbin 20, a so-called customer connector piece or harness holder 46 is molded over shank portion 40 of bobbin 20 as shown in FIG. 5. Connector 46 is preferably made of a polyether-imide or other thermoplastic resin material and comprises a front cylindrical portion 48, a rear flange 50 of the bobbin assembly having radially outer faces 49 and 52, a terminal receiving portion 54, and enlarged diameter portion 56 for receiving terminal housing 58 (FIG. 1) of submersible connector 12. Referring to FIGS. 10–12, an alternative embodiment is shown in which connector 184 is molded integrally with shank portion 182 of the bobbin.

Referring again to FIGS. 2 and 5, after connector 46 is molded over shank portion 40 of bobbin 20, web portion 18 is sheared out as shown in FIG. 2. in order to separate terminals 16. In addition, as shown in FIG. 3, terminal ends 59 of terminals 16 are simultaneously bent into position during shearing of web 18, in which they are later to receive magnet wire coil ends 61 and 63 and later yet to be soldered.

Figure 6:
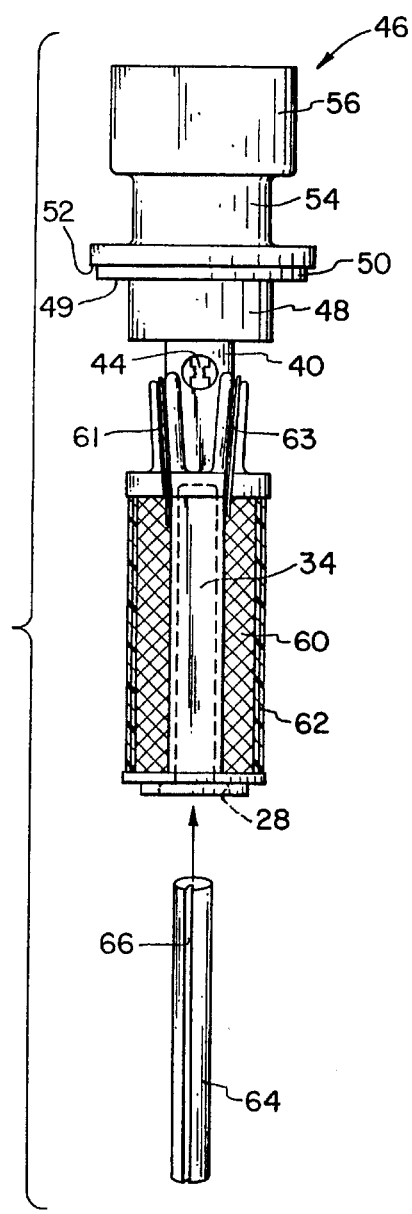
FIG. 6 is an elevational view of the bobbin assembly including the connector overmold and the magnet wire wrapped about the bobbin, and further including a pole piece being inserted into the ID of the bobbin.

Referring primarily to FIGS. 3, 5, and 6, after connector 46 is overmolded onto bobbin shank portion 40, magnet wire 60, preferably ranging from 38 to 40 gauge, is wound into a coil onto bobbin barrel 32 between front flange 22 and rear coil flange 38. In particular, start and finish wire end portions 61 and 63 of coil 60 are skeined back and forth and then twisted, whereupon they are placed into wire slots 42 and preferably spiral wrapped onto legs 59 of terminal 16. Wire slots 42 offer protection to end portions 61 and 63 in two ways. First, the start wire 61 avoids being nicked as wire 60 is coiled about barrel 32. Second, slots 42 generally protect the skeined wire ends 61 and 63 from damage upon further assembly of the sensor.

Referring to FIGS. 3 and 6, once wire ends 61, 63 are wrapped about terminal legs 59, the wire ends and legs are soldered simultaneously in a dip solder process. Then, coil 60 is wrapped with two layers of a fluorine-containing polymer resin, such as Teflon (tm) tape 62, in order to protect the insulation on magnet wire 60 from damage upon subsequent assembly of sensor 10. It is noted that tape 62 will not degrade at high temperatures and also will not stick to magnet wire 60 thereby permitting magnet wire 60 to expand and contract at its own rate during thermal cycling thereby eliminating the risk of damage due to differential expansion rates. In addition, Teflon tape 62 adequately adheres to itself so that magnet wire 60 is secured in place for subsequent assembly of sensor 10. Alternatively, fiberglass tape may be employed.

Referring now to FIG. 6, a pole piece 64 is inserted into cavity 34 in bobbin 20. Preferably, pole piece 64 is made of a mechanically and magnetically soft ferrous material which is of low coercive force and high permeability, such as AISI 1008, 1010, or 12L14 steel. It should be noted that the outer diameter of pole piece 64 is slightly larger (e.g. 0.002 inch) than the inner diameter of barrel cavity 34 so that pole piece 64 is press fit therein to minimize any air gap between pole piece 64 and the cavity walls. Pole piece 64 includes a groove 66 along the length thereof so that, as pole piece 64 is press fit into closed-ended cavity 34, air within cavity 34 is permitted to escape through groove 66 to permit pole piece 64 to be completely inserted within cavity 34. Alternatively, cavity 34 may include a groove which permits the escape of air. As yet another alternative, pole piece 64 may include a flat portion instead of a groove. In yet another alternative, pole piece 64 includes neither a groove nor a flat section. However, the out of roundness of cavity 34 would permit the air to escape. The press fit pole piece, along with a rigid compression of the bobbin assembly during ultrasonic welding which shall be discussed hereinafter, maintains the vibrational and shock capability of a conventional encapsulated sensor.

As shown in FIG. 7, after the pole piece has been inserted into bobbin 20, a front seal ring 26 is stretch fit over front groove 24 onto groove surface 25 of bobbin 20 as shown by arrows 69. Thereafter, magnet 30 is inserted into magnet pocket 28 as shown by arrow 70. Preferably, magnet 30 is a rare earth such as samarium cobalt. Upon inserting magnet 30 into pocket 28, the bobbin assembly 80 is formed and ready to be housed by an outer sensor shell 76. Before sealing, rear seal ring 72 is mounted onto sensor shell 76 in the direction indicated by arrow 78, as shown in FIG. 7. Seal rings 26 and 72 are preferably made from fluorosilicone, which maintains structural integrity and sealing properties from minus 100° F. up to 350° F.

Hollow sensor shell 76 is made of the same material as connector 46 and generally comprises a front cylindrical portion 82 having a front wall 84 with an opening 86 therein. The inner surface 88 of front wall 84 includes a pocket 90 in communication with opening 86. Pocket 90 is designed to receive a portion of magnet 30 upon assembly. Sensor shell 76 further includes a generally threaded cylindrical portion 92 and an enlarged integral rear portion 94 resembling a nut. However, it is recognized that the outer sensor shell may be of any desired configuration and still house a common bobbin assembly 80. Rear portion 94 includes a rear opening 96 having a inner diameter surface 98 defining a shoulder 100. As shown in FIG. 7, rear portion 94 further includes an integral inner flanged portion 102 having a generally annular grooved surface 104 therein for reception of rear seal ring 72. Flanged portion 102 defines a reduced diameter opening 106 that extends for most of the length of shell 76.

Sensor shell 76 is mounted over bobbin assembly 80 as shown by arrow 108 until surface 52 of connector flange 50 comes into contact with shoulder 100. As this occurs, flange 50 is ultrasonically welded to the shear land or wall of inner diameter surface 98, thereby creating a shear joint 110 (FIGS. 2 and 3) which is 360° of melted plastic so that flange 50 and rear shell wall 112 become substantially integral with one another. Simultaneously, front O-ring 26 is compressed between flange 22 and inner surface 88 of front wall 84, and rear O-ring 72 is compressed between rear seal groove 104 and the underside 49 of flange 50. Preferred dimensions for the O-rings and grooves are such that when front O-ring 26 is compressed within its normal band, the sensor seals up to 60 psi air pressure therein.

The compression of front seal ring 26 is additionally maintained at elevated temperatures since the coefficient of expansion of bobbin 20 is preferably greater than that of sensor shell 76 due to the lower glass content of the bobbin material as compared to that of the sensor shell.

Figure 15:
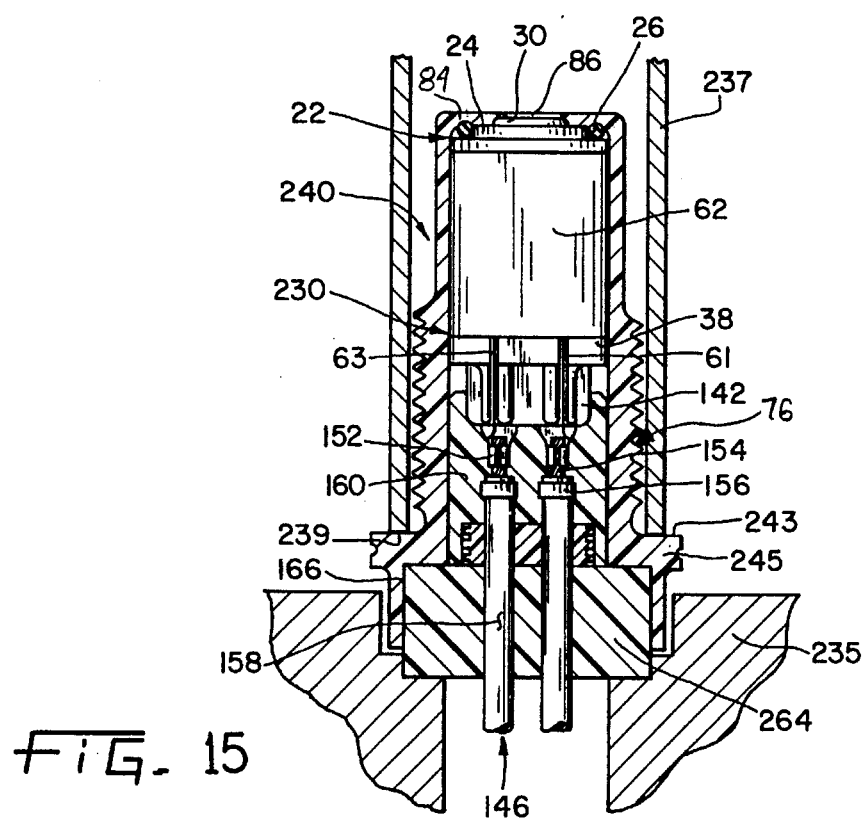
FIG. 15 is a view of the bobbin assembly of FIGS. 13 and 14, particularly showing the final position of the weld horn as the hollow sensor shell is welded to the bobbin assembly.

It is recognized that the matching of length dimensions on shell 76 and connector 46 enable simultaneous compression of front 26 and rear 72 seal rings during welding. In other words, the distance from the front face of front flange 22 of bobbin 20 to the underside face 49 of connector flange 50 corresponds to the distance from front inner wall surface 88 of shell 76 to flange surface 102 containing rear groove 104 so that both O-rings are sealingly compressed upon assembly. It is further recognized that the ultrasonic shear weld alone creates the primary seal in the rear portion of the sensor and that rear seal ring 72 is considered a secondary seal. In fact, an adequate seal may be achieved in some cases without utilizing rear seal ring 72. For example, as shown in FIGS. 12 and 15, these alternative embodiments do not include a rear seal ring.

Upon mounting sensor shell 76 over bobbin assembly 80, magnet pocket 90 receives a portion of magnet 30, with the remaining portion of magnet 30 being housed within pocket 28 in bobbin assembly 80. This reduces the magnetic air gap between coil wires 60 and magnet 30 since the magnetic pocket is somewhat indented into the front of front bobbin flange 22 and thus increases the strength of the magnetic circuit. In addition, dual magnet pockets 28 and 90 assure proper centering of magnet 30, which is especially important for position sensing applications.

A feature of the present invention is that opening 86 in front shell wall 84 permits magnet 30 to be exposed through shell housing 76. Because of the stack up of tolerances of bobbin assembly 80, sensor shell 76, magnet 30 and magnet pockets 28 and 90, there is an air gap of up to about 0.008 inch between the inside wall 114 of magnet pocket 90 and the forward face of magnet 30. In order to eliminate this air gap, wall 84 of the sensor shell is heated to just above its glass transition temperature, i.e. about 419° F. for Ultem, whereupon wall 84 is staked with a cold tool until the forward face of magnet 30 engages inside wall 114 of pocket 90. In addition, the hot air/cold stake process forces magnet 30 into intimate contact with the forward end of pole piece 64 as well as rigidly captures the magnet within the two pockets. As shown in FIG. 7, the outer surface 116 of wall 84 includes a generally annular lip portion 118 about opening 86. Lip 118 is provided to aid engagement of magnet 30 during the staking process and is collapsed as a result thereof.

Opening 86 in front wall 84 of sensor shell 76 is preferably about 0.015 inch in thickness. In variable reluctance sensor applications, generally the smallest air gap between a reluctor wheel and the end of the sensor is 0.020 inch. This is generally because of tolerance stackups in machining the reluctor wheel and other system components. In addition, the reluctor wheel is on a radius so that the closest the reluctor wheel and the sensor come in proximity (0.020 inch) is at the midpoint of the sensor. Thus, 0.015 inch of the 0.020 inch gap can be invaded by the sensor without touching the gear or reluctor wheel, thereby minimizing the Working air gap between the reluctor wheel and the magnet. This results in a 25% to 40% increase in the output over a conventional sensor with a closed-ended housing.

Figure 8:
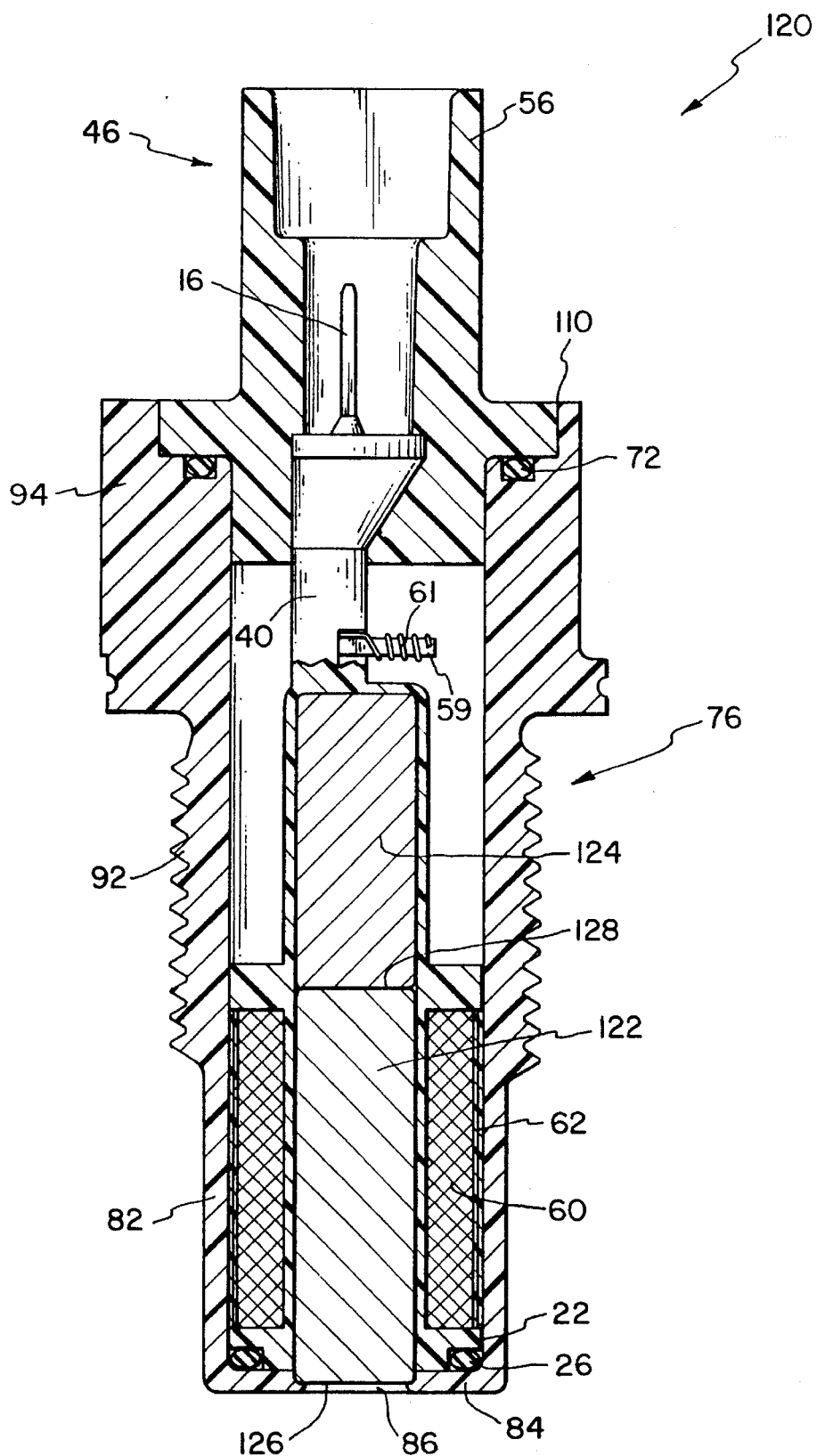
FIG. 8 is a vertical sectional view of an alternative embodiment of the variable reluctance sensor shown in FIGS. 1–7, particularly showing the magnet and pole piece in alternative locations.

Referring now to FIG. 8, as an alternative embodiment to the sensor shown in FIGS. 1–7, there is shown a sensor 120 which is substantially similar to sensor 10 except that pole piece 122 and magnet 124 are in reverse order within the bobbin. In particular, end 126 of pole piece 122 is exposed through opening 86 in front wall 84 of the sensor shell. Magnet 124, which is located rearwardly within the bobbin, is in contact with pole piece 122 at 128. Although the magnet and pole piece orientation has been changed in this embodiment, the general packaging principles discussed heretofore are applicable here as well.

Figure 9:
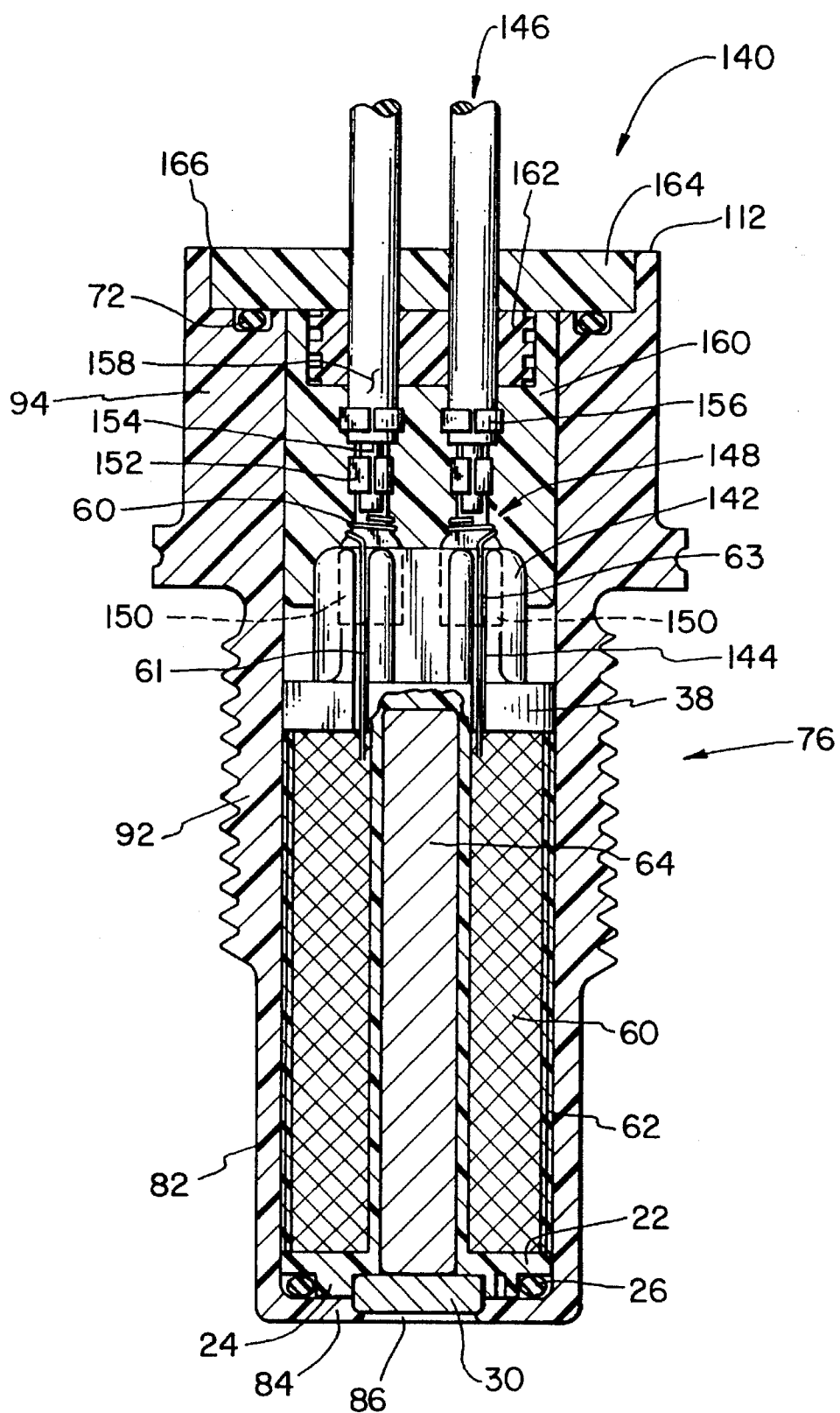
FIG. 9 is a vertical sectional view (with the bobbin in partial section) of an alternative embodiment of the sensor shown in FIGS. 1–7, particularly showing a leaded sensor design.

Referring now to FIG. 9, another embodiment of the present invention is shown. In this embodiment, a so-called "leaded sensor" 140 is shown and includes a bobbin that is similar to the bobbin shown previously except that the rear end portion 142 is substantially squared-off and includes a pair of openings for receiving the ends 150 of separate terminals 148 via a press fit. As shown, ends 61 and 63 of magnet wire 60 are wrapped around respective terminals 148 and soldered. A pair of electrical leads 146 are connected to respective terminals 148 by crimping tangs 152 and 156 which are integral parts of each terminal 148. The first pair of tangs 152 are crimped over a respective conductor 154 of lead 146, and the second pair of tangs 156 are crimped over insulation 158 of respective lead 146.

After leads 146 are securely crimped in place, a harness holder 160 is overmolded onto rear portion 142 of the bobbin. Harness holder 160 holds leads 146 in place and includes a cavity in its rear portion to accept a custom seal 162, preferably made of fluorosilicone. A rear flange piece 164, preferably made of the same material as shell 76, is then ultrasonically welded to shell 76 as described previously to create a shear joint 166 which is 360° of melted plastic so that shell wall 112 and flange piece 164 become substantially integral. As rear flange piece 164 of the bobbin assembly is ultrasonically welded in place, front 26 and rear 72 seals are compressed as well as custom seal 162 around each lead 146 and within the harness holder cavity to create a fluid-tight seal therebetween. It is recognized that both custom seal 162 and flange piece 164 may be of a variety of sizes and configurations as desired. For example, a single lead may be desired instead of two leads as shown, thereby causing the custom seal and flange piece to each have only one opening instead of two.

Figure 13:
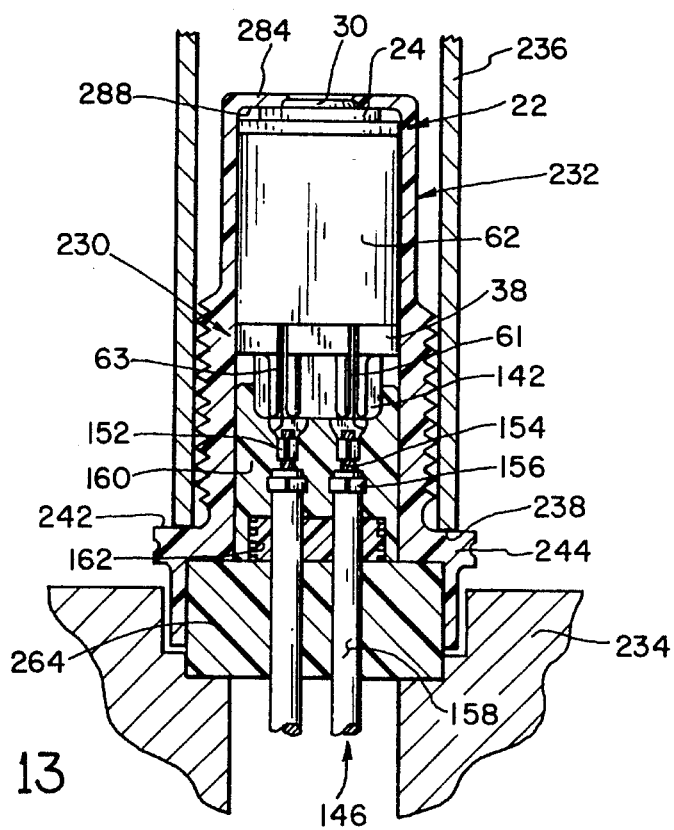
FIG. 13 is a sectional view of an alternative embodiment to the leaded sensor shown in FIG. 9, wherein the bobbin assembly is shown mounted to a weld fixture with a dummy housing disposed over the bobbin assembly.
Figure 14:
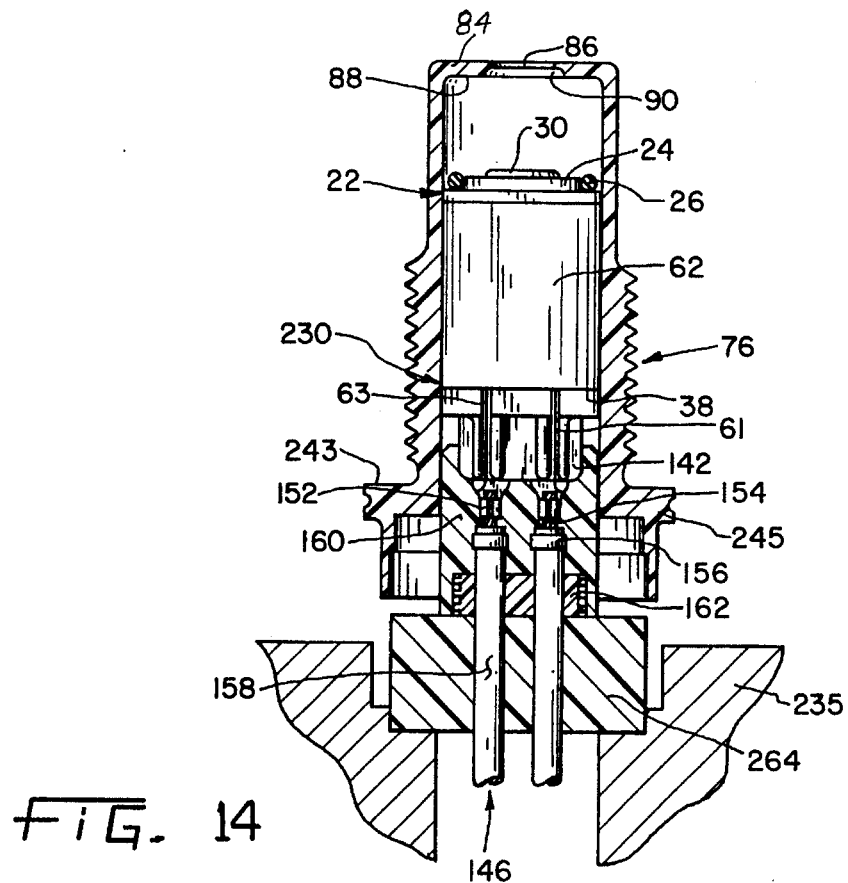
FIG. 14 is a view of the bobbin assembly of FIG. 13, showing the dummy housing removed and a hollow sensor shell being placed over the bobbin assembly.

Referring to FIGS. 10–15, there is shown a method for automatically ultrasonically welding a hollow sensor shell to a bobbin assembly for both the customer connector type of sensor (FIGS. 10–12) and the leaded type of sensor (FIGS. 13–15). The automatic welding method is performed by a welding apparatus comprising a series of stations. The welding apparatus also includes an automatic computerized controller (not shown) comprising an encoder, which is a piece of hardware on the welding apparatus that measures a single input variable and then outputs the variable to a microprocessor to control a characteristic of the welding process. The input variable to be measured by the present method is the final position of the weld horn at which the actual welding takes place.

In securing the hollow shell to the bobbin assembly, it is very important that the front O-ring seal be compressed sufficiently enough to prevent the flow of fluid therearound. In order to assure that the front elastomeric O-ring seal is adequately compressed, the length dimensions of both the bobbin assembly and the hollow outer shell must be accurately maintained. In order to adequately compress the front O-ring seal within its groove in the front flange, the forward surface of the reduced diameter portion of the front bobbin flange must be forced into contacting engagement with the inner surface of the front face of the hollow shell. In other words, the bobbin assembly must "bottom out" against the inner front face of the hollow shell.

The hollow outer shells can be manufactured with relatively little or no variation in its length dimension from shell to shell. However, the corresponding length dimensions of each manufactured bobbin assembly experience significantly more variation from one another. Thus, the position of the rear flange of each bobbin assembly to be welded is slightly different from one another. Accordingly, the welding device (or weld horn) must be at a slightly different position for each bobbin assembly to be welded to its respective shell. If the weld horn were programmed to weld at an identical position for each bobbin assembly, there is a possibility that slightly shorter bobbin assemblies would not be pushed far enough forward within the shell, which could result in inadequate compression of the front elastomeric seal.

In order to assure adequate compression of the front elastomeric seal before the shell is ultrasonically welded to the bobbin assembly, a measuring process must be performed to determine the precise point that the ultrasonic weld should occur. In a preferred method, the bobbin assembly is positioned within either the actual shell to be used or a simulated (dummy) shell. In another preferred method, the bobbin assembly is positioned with respect to a surface that simulates the inner front wall of the sensor shell. The weld horn or another similar measuring device (e.g. a dummy weld horn) is positioned on either the rear flange of the bobbin assembly or on the sensor shell. The force applied by the dummy weld horn as it contacts the bobbin assembly or shell aids in forcing the bobbin assembly into proper position, i.e. the front surface of the front flange being "flush" with a surface representing the inner surface of the front wall of the sensor shell. Once the proper position of the bobbin assembly is established, the precise position of the weld horn is measured. As noted previously, the final position of the weld horn will vary for each bobbin assembly.

The actual sensor shell is then loaded into a holder on the welding apparatus, and the bobbin assembly is positioned within the shell. The weld horn is then lowered to the measured final position, and the rear flange of the bobbin is ultrasonically welded to the open rear end portion of the shell. Simultaneously, the front flange of the bobbin assembly is forced into contacting engagement with the inner surface of the front wall of the shell, thereby compressing the elastomeric seal. Since this method as it relates to the harness holder design is different from that for the leaded sensor design, a discussion of each is now described.

Referring now to FIGS. 10–12, there is disclosed a bobbin assembly 180 of the connector or harness holder type. Assembly 180 is similar to bobbin assembly 80, described above, except that connector 184 of assembly 180 is molded integrally with the bobbin. In FIG. 10, bobbin assembly 180 is shown secured to a first (measurement) station of a welding apparatus. In particular, front flange 22 of bobbin assembly 180 is positioned on a weld fixture 186, which simulates the front wall of a hollow shell for measurement purposes. The front face of reduced diameter portion 24 is in contacting engagement or "flush" against the top surface 188 of fixture 186, which represents the inner surface of the front shell wall. Thus, this position simulates the position of bobbin assembly 180 being bottomed out against the inner surface of the front face of a hollow shell.

Referring still to FIG. 10, a measuring device 190 in the form of a simulated (dummy) weld horn is lowered onto the rear surface 192 of rear flange 50 of bobbin assembly 180. The position of dummy horn 190 shown in FIG. 10 is the final position at which the welding process is to occur. The encoder measures the final position of the dummy horn in which ends 194 of the dummy horn are flush against top surface 192 of rear flange 50. Preferably, this distance is measured to an accuracy of about 0.0001 inch.

As shown in FIG. 10, rear flange 50 of bobbin assembly 180 is supported on a spring-loaded piece 196 during the measuring process. As the dummy horn 190 is lowered to its final position, ends 194 contact top surface 192 of rear flange 50 with a slight amount of pressure which pushes the bobbin assembly into position. Spring-loaded piece 196 permits rear flange 50 to absorb the down force of dummy horn 190 without deflecting the rear flange.

Referring to FIG. 11, a second (weld) station of the welding apparatus is shown, in which a hollow sensor shell 76 is loaded into weld fixture 186. Preferably, weld fixture 186 is elongated to extend from the first station to the second station. Shell 76 is accurately loaded into the second station of weld fixture 186 because upstanding flange 187 assures proper placement of shell 76 in the fixture. Shell 76 includes front O-ring seal 26 in a recessed portion on the inner surface 88 of front wall 84 surrounding opening 90. Enlarged integral rear portion 94 of shell 76 is supported by an upper fixture 200 that is securely clamped onto portion 94. Bobbin assembly 180 is then inserted into hollow shell 76.

Referring to FIG. 12, bobbin assembly 180 is shown being welded to shell 76. In particular, a weld horn 202 is lowered to the final distance measured by dummy horn 190, which is identical in dimension to actual weld horn 202. Preferably, weld horn 202 is actuated prior to being lowered to its final position. As the ends of weld horn 202 engage top surface 192 of rear flange 50, the front surface of front flange portion 24 is automatically forced flush with the inner surface 88 (FIG. 11) of front wall 84 of shell 76, thereby adequately compressing front elastomeric seal 26. Flange 50 is simultaneously ultrasonically welded to the shear and of inner diameter surface 98 (FIG. 11), thereby creating a shear joint 110. A preferable welding time is about 50 milliseconds. A preferable cycle time is about 3 seconds. Shear joint 110 alone is sufficient to prevent the flow of fluid through the rear end of the sensor to the electric coil.

FIGS. 13–15 illustrate the same type of automatic welding process as shown in FIGS. 10–12, except that this process refers specifically to the leaded sensor design. Sensor assembly 240 (FIG. 15) with leads extending therefrom is substantially similar to leaded sensor assembly 140 shown in FIG. 9. One difference is that the rear flange piece 164 of sensor 140 is much thinner than the rear flange piece 264 sensor 240.

Referring to FIG. 13, the bobbin assembly 230 and the dummy housing or sensor shell 232 are loaded into a weld fixture at a first station 234 of the weld apparatus. It will be appreciated that an actual shell 76 may be used instead of a dummy shell. Like fixture 186, weld fixture 234, 235 is an elongated solid piece extending from the first (measurement) station 234 to the second (weld) station 235. Alternatively, the fixture may comprise a single station. The measurement station. 234 is mechanically connected to the weld station 235 so that the encoder assures precise measurements from the first station to the second station.

As shown in FIG. 13, reduced diameter portion 24 of front flange 22 of bobbin assembly 230 is flush with inner surface 288 of the front wall 284 of dummy housing 232. Electrical leads 146 are oriented in the down position, and the magnet end of bobbin assembly 230 is oriented in the up position. A measuring device (dummy weld horn) 236 is then lowered from its initial position to a final position shown in FIG. 13, wherein the ends 238 of horn 236 are in contacting engagement with top surface 242 of flange 244 of dummy housing 232. The force applied by ends 238 as they engage surface 242 forces housing 232 downwardly a slight distance to ensure that the front surface of flange portion 24 is in contacting engagement with inner wall surface 288. The final position of device 236 is measured by an encoder and is then fed to the microprocessor of the controller of the ultrasonic welding equipment.

FIG. 14 illustrates the second station of the welding apparatus. In particular, the horn 236 and dummy housing 232 are removed, and an elastomeric O-ring seal 26 is stretch fit over reduced diameter portion 24 onto a front groove surface of the bobbin assembly. Then, an outer sensor shell 76 is installed over bobbin assembly 230, which is secured in station 235 of the weld fixture.

As shown in FIG. 15, weld horn 237 is actuated and ends 239 of horn 237 are moved to the measured final position to engage flange surface 243 on shell 76, thereby ultrasonically welding rear flange piece 264 to shell 76 to create a shear joint 166, which is sufficient to prevent the flow of fluid through the open rear end portion of shell 76. Simultaneously shell 76 is forced down over bobbin assembly 230 sufficiently to cause reduced diameter portion 24 of front flange 22 to engage inner front wall surface 88 (FIG. 14) thereby compressing seal 26 between flange 22 and wall 84 to prevent the flow of fluid therearound.

It will be appreciated that the foregoing is presented by way of illustration only, and not by way of any limitation, and that various alternatives and modifications may be made to the illustrated embodiment without departing from the spirit and scope of the invention.

What is claimed is:

1. A method of assembling a submersible variable reluctance magnetic sensor, the method comprising the steps of:

providing a bobbin including a barrel portion having a cavity therein, said cavity being accessible from an end of said bobbin;

winding a magnet wire into a coil about said barrel portion;

attaching a start wire and a finish wire of said wire coil to a respective electrically conductive terminal for electrical output from said coil to an external circuit;

inserting a pole piece into said cavity;

placing a magnet on said bobbin adjacent said pole piece;

attaching an elastomeric seal to a front edge of said bobbin;

inserting said bobbin into an outer hollow shell having an open rear end portion and a front end portion having a front wall with an opening therein, such that said magnet is exposed therethrough, wherein said elastomeric seal is compressed between said front wall of said shell and said front edge of said bobbin to form a fluid-tight seal therebetween; and ultrasonically welding a rear piece to said open rear end portion for forming a fluid-tight seal therebetween.

2. The method of assembling the sensor of claim 1, including providing a single stamping comprising said two terminals and a web portion formed integrally between said terminals, wherein the method includes the step of insert molding said stamping into said bobbin.

3. The method of assembling the sensor of claim 2, including the step of shearing said web portion in half after said stamping is insert molded into said bobbin.

4. The method of assembling the sensor of claim 1, including the step of overmolding a connector piece onto a shank portion of said bobbin before winding said magnet wire about said barrel portion.

5. The method of assembling the sensor of claim 1, wherein said rear end portion of said shell includes an inner diameter surface proximal to an outer edge of said rear end portion, and an integral flanged portion defining a reduced diameter surface distal to said outer edge, wherein said connector piece includes a flange, the method including the step of placing a rear elastomeric seal onto said integral flanged portion before inserting said bobbin assembly into said outer shell.

6. The method of assembling the sensor of claim 1, including the step of hot air cold staking said front end portion of said outer shell with a cold tool until a forward face of said magnet substantially engages an inner surface of said front wall.

7. The method of assembling the sensor of claim 1, including the steps of:

providing a second outer hollow shell that is sized and configured to a shape that is different from that of said first shell; and selectively inserting said bobbin assembly into one of said first shell and said second shell.

8. A method of securing a bobbin assembly to an outer hollow shell to form a submersible variable reluctance magnetic sensor, wherein the bobbin assembly comprises a magnet at an end thereof and an electric coil electromagnetically coupled to the magnet for generating pulse voltages according to a change in the distance between an object to be detected and a magnetic field formed by the magnet and the electric coil, the bobbin assembly further comprising a front end including a front flange and a rear end including a rear flange, wherein the electric coil is disposed between the front flange and the rear flange, wherein the hollow shell includes an open rear end portion and a front end portion having a front wall with an opening therein to permit the magnet to be exposed therethrough, the method comprising the steps of:

inserting the bobbin assembly into a first holder on a welding apparatus such that an outer surface of the front flange is in contacting engagement with an engagement surface simulating an inner surface of the front wall of the hollow shell;

causing movement of a measuring device from an initial position to a final position at which the measuring device is in contacting engagement with a top surface of the rear flange of the bobbin assembly, the measuring device being one of a welding device and a device simulating a welding device;

measuring the final position of the measuring device;

removing the measuring device and the engagement surface from the bobbin assembly;

loading the hollow sensor shell into a second holder on the welding apparatus, wherein the shell includes an elastomeric seal disposed about the opening on the inner surface of the front wall thereof;

inserting the bobbin assembly into the hollow sensor shell;

moving the welding device to the final position, thereby causing the weld horn to be positioned in contacting engagement against the top surface of the rear flange of the bobbin assembly; and ultrasonically welding the rear flange of the bobbin assembly to the rear end portion of the hollow shell for sealing the electric coil from fluid flow through said open rear end portion, wherein the front flange of the bobbin assembly is caused to be in contacting engagement with the inner surface of the front wall of the sensor shell, thereby compressing the elastomeric seal between the front flange and the inner wall surface sufficiently to seal the electric coil from fluid flow through the opening.

9. A method of securing a bobbin assembly to an outer hollow shell to form a submersible variable reluctance magnetic sensor, wherein the bobbin assembly comprises a magnet at an end thereof and an electric coil electromagnetically coupled to the magnet for generating pulse voltages according to a change in the distance between an object to be detected and a magnetic field formed by the magnet and the electric coil, the bobbin assembly further comprising a front end including a front flange and a rear end including a rear flange, wherein the electric coil is disposed between the front flange and the rear flange, wherein the hollow shell includes an open rear end portion and a front end portion having a front wall with an opening therein to permit the magnet to be exposed therethrough, the method comprising the steps of:

inserting the bobbin assembly into a holder on a welding apparatus;

causing a front surface of the front flange of the bobbin assembly to come into contacting engagement with a flat engagement surface;

causing movement of a measuring device simulating a welding device from an initial position to a final position at which the measuring device is in contacting engagement with one of the bobbin assembly and a measuring piece containing the flat surface;

measuring the final position of the measuring device;

removing the measuring device and the engagement surface from the bobbin assembly;

loading the hollow sensor shell into the holder such that the bobbin assembly is positioned within the shell, wherein an elastomeric seal is disposed about the opening between the inner surface of the front wall of the shell and the front surface of the front flange of the bobbin;

moving the welding device to the final position; and ultrasonically welding the rear flange of the bobbin assembly to the rear end portion of the hollow shell for sealing the electric coil from fluid flow through the open rear end portion and for causing the front flange of the bobbin assembly to be in contacting engagement with the inner surface of the front wall of the sensor shell, thereby compressing the elastomeric seal between the front flange and the inner wall surface sufficiently to seal the electric coil from fluid flow through the opening.

10. A method of securing a leaded bobbin assembly to an outer hollow shell to form a submersible variable reluctance magnetic sensor, wherein the bobbin assembly comprises a magnet at an end thereof and an electric coil electromagnetically coupled to the magnet for generating pulse voltages according to a change in the distance between an object to be detected and a magnetic field formed by the magnet and the electric coil, the bobbin assembly further comprising a front end including a front flange and a rear piece including a rear piece opening therein and a pair of electrical leads extending through the rear piece opening and secured to a rear portion of the bobbin assembly, wherein ends of the electric coil are electrically secured to the electrical leads, wherein the electric coil is disposed between the front flange and the rear flange, wherein the hollow shell includes an open rear end portion and a front end portion having a front wall with an opening therein to permit the magnet to be exposed therethrough, the method comprising the steps of:

inserting the bobbin assembly and a first hollow shell into a holder on a welding apparatus such that an outer surface of the front flange is in contacting engagement with an inner surface of the front wall of the first shell;

causing movement of a measuring device from an initial position to a final position at which the measuring device is in contacting engagement with the first shell;

measuring the final position of the measuring device, the measuring device being one of a weld horn and a device simulating a weld horn;

retracting the measuring device and removing the first shell from the bobbin assembly;

loading a second hollow shell onto the bobbin assembly, wherein the second shell includes an elastomeric seal disposed about the opening on the inner surface of the front wall thereof;

moving the weld horn to the final position to cause the weld horn to be positioned in contacting engagement against the second shell; and ultrasonically welding the rear flange of the bobbin assembly to the rear end portion of the second shell for sealing the electric coil from fluid flow through said open rear end portion, thereby causing the front flange of the bobbin assembly to be in contacting engagement with the inner surface of the front wall of the second shell, thereby compressing the elastomeric seal between the front flange and the inner wall surface sufficiently to seal the electric coil from fluid flow through the opening.

11. A method of securing a bobbin assembly to an outer hollow shell to form a submersible variable reluctance magnetic sensor, wherein the bobbin assembly comprises a magnet at an end thereof and an electric coil electromagnetically coupled to the magnet for generating pulse voltages according to a change in the distance between an object to be detected and a magnetic field formed by the magnet and the electric coil, the bobbin assembly further comprising a front end including a front flange and a rear end including a rear flange, wherein the electric coil is disposed between the front flange and the rear flange, wherein the hollow shell includes an open rear end portion and a front end portion having a front wall with an opening therein to permit the magnet to be exposed therethrough, the method comprising the steps of:

inserting the bobbin assembly and the hollow shell into a holder on a welding apparatus, wherein the bobbin assembly is disposed with the hollow shell;

bringing a welding device on the welding apparatus into contact with one of the bobbin assembly and the hollow shell; and ultrasonically welding the rear flange of the bobbin assembly to the rear end portion of the hollow shell for sealing the electric coil from fluid flow through the open rear end portion, wherein the front flange of the bobbin assembly is caused to be in contacting engagement with an inner surface of the front wall of the hollow shell, thereby compressing an elastomeric seal positioned in a groove about the opening between the front flange and the inner surface of the front wall sufficiently to seal the electric coil from fluid flow through the opening.

12. A method of assembling a submersible variable reluctance magnetic sensor, the method comprising the steps of:

providing a bobbin including a barrel portion having a cavity therein, said cavity being accessible from an end of said bobbin;

winding a magnet wire into a coil about said barrel portion;

attaching a start wire and a finish wire of said wire coil to a respective electrically conductive terminal for electrical output from said coil to an external circuit through a rear piece;

inserting a pole piece into said cavity;

placing a magnet on said bobbin adjacent said pole piece;

inserting said bobbin into an outer hollow shell having an open rear end portion; and ultrasonically welding said rear piece to said open rear end portion for forming a fluid-tight seal therebetween.

13. The method of assembling the sensor of claim 12, including providing a single stamping comprising said two terminals and a web portion formed integrally between said terminals, wherein the method includes the step of insert molding said stamping into said bobbin.

14. The method of assembling the sensor of claim 13, including the step of shearing said web portion in half after said stamping is insert molded into said bobbin.

15. A method of assembling a submersible variable reluctance magnetic sensor, the method comprising the steps of:

providing a bobbin including a barrel portion having a cavity therein, said cavity being accessible from an end of said bobbin;

winding a magnet wire into a coil about said barrel portion;

attaching a start wire and a finish wire of said wire coil to a respective electrically conductive terminal for electrical output from said coil to an external circuit;

inserting a pole piece into said cavity;

placing a magnet on said bobbin adjacent said pole piece;

inserting said bobbin into an outer hollow shell having an open rear end portion;

ultrasonically welding a rear piece to said open rear end portion for forming a fluid-tight seal therebetween; and hot air cold staking a front end portion of said outer shell with a cold tool until a forward face of said magnet substantially engages an inner surface of a front wall of said front end portion.

16. A method of securing a bobbin assembly to an outer hollow shell to form a submersible variable reluctance magnetic sensor, wherein the bobbin assembly comprises a magnet at an end thereof and an electric coil electromagnetically coupled to the magnet for generating pulse voltages according to a change in the distance between an object to be detected and a magnetic field formed by the magnet and the electric coil, the bobbin assembly further comprising a front end including a front flange and a rear end including a rear flange, wherein the electric coil is disposed between the front flange and the rear flange, wherein the hollow shell includes an open rear end portion and a front end portion, the method comprising the steps of:

inserting the bobbin assembly into a first holder on a welding apparatus such that an outer surface of the front flange is in contacting engagement with an engagement surface simulating an inner surface of the front wall of the hollow shell;

causing movement of a measuring device from an initial position to a final position at which the measuring device is in contacting engagement with a top surface of the rear flange of the bobbin assembly, the measuring device being one of a welding device and a device simulating a welding device;

measuring the final position of the measuring device;

removing the measuring device and the engagement surface from the bobbin assembly;

loading the hollow sensor shell into a second holder on the welding apparatus;

inserting the bobbin assembly into the hollow sensor shell;

moving the welding device to the final position, thereby causing the weld horn to be positioned in contacting engagement against the top surface of the rear flange of the bobbin assembly; and ultrasonically welding the rear flange of the bobbin assembly to the rear end portion of the hollow shell for sealing the electric coil from fluid flow through said open rear end portion.

17. A method of securing a bobbin assembly to an outer hollow shell to form a submersible variable reluctance magnetic sensor, wherein the bobbin assembly comprises a magnet at an end thereof and an electric coil electromagnetically coupled to the magnet for generating pulse voltages according to a change in the distance between an object to be detected and a magnetic field formed by the magnet and the electric coil, the bobbin assembly further comprising a front end including a front flange and a rear end including a rear flange, wherein the electric coil is disposed between the front flange and the rear flange, wherein the hollow shell includes an open rear end portion and a front end portion, the method comprising the steps of:

inserting the bobbin assembly into a holder on a welding apparatus;

causing a front surface of the front flange of the bobbin assembly to come into contacting engagement with a flat engagement surface;

causing movement of a measuring device simulating a welding device from an initial position to a final position at which the measuring device is in contacting engagement with one of the bobbin assembly and a measuring piece containing the flat surface;

measuring the final position of the measuring device;

removing the measuring device and the engagement surface from the bobbin assembly;

loading the hollow sensor shell into the holder such that the bobbin assembly is positioned within the shell;

moving the welding device to the final position; and ultrasonically welding the rear flange of the bobbin assembly to the rear end portion of the hollow shell for sealing the electric coil from fluid flow through the open rear end portion.

18. A method of securing a leaded bobbin assembly to an outer hollow shell to form a submersible variable reluctance magnetic sensor, wherein the bobbin assembly comprises a magnet at an end thereof and an electric coil electromagnetically coupled to the magnet for generating pulse voltages according to a change in the distance between an object to be detected and a magnetic field formed by the magnet and the electric coil, the bobbin assembly further comprising a front end including a front flange and a rear piece including a rear piece opening therein and a pair of electrical leads extending through the rear piece opening and secured to a rear portion of the bobbin assembly, wherein ends of the electric coil are electrically secured to the electrical leads, wherein the electric coil is disposed between the front flange and the rear flange, wherein the hollow shell includes an open rear end portion and a front end portion; the method comprising the steps of:

- inserting the bobbin assembly and a first hollow shell into a holder on a welding apparatus such that an outer surface of the front flange is in contacting engagement with an inner surface of the front wall of the first shell;
- causing movement of a measuring device from an initial position to a final position at which the measuring device is in contacting engagement with the first shell;
- measuring the final position of the measuring device, the measuring device being one of a weld horn and a device simulating a weld horn;
- retracting the measuring device and removing the first shell from the bobbin assembly;
- loading a second hollow shell onto the bobbin assembly;
- moving the weld horn to the final position to cause the weld horn to be positioned in contacting engagement against the second shell; and
- ultrasonically welding the rear flange of the bobbin assembly to the rear end portion of the second shell for sealing the electric coil from fluid flow through said open rear end portion.

19. A method of securing a bobbin assembly to an outer hollow shell to form a submersible variable reluctance magnetic sensor, wherein the bobbin assembly comprises a magnet at an end thereof and an electric coil electromagnetically coupled to the magnet for generating pulse voltages according to a change in the distance between an object to be detected and a magnetic field formed by the magnet and the electric coil, the bobbin assembly further comprising a front end including a front flange and a rear end including a rear flange, wherein the electric coil is disposed between the front flange and the rear flange, wherein the hollow shell includes an open rear end portion to permit communication of said pulse voltages by an electrically conductive element passing therethrough, and a front end portion having a front wall with an opening therein to permit the magnet to be exposed therethrough, the method comprising the steps of:

- inserting the bobbin assembly and the hollow shell into a holder on a welding apparatus, wherein the bobbin assembly is disposed with the hollow shell;
- bringing a welding device on the welding apparatus into contact with one of the bobbin assembly and the hollow shell; and
- ultrasonically welding the rear flange of the bobbin assembly to the rear end portion of the hollow shell for sealing the electric coil from fluid flow through the open rear end portion said electrically conductive element being fixed to and extending through said rear end portion.

* * * * *